(12) United States Patent
Kang et al.

(10) Patent No.: US 12,308,173 B2
(45) Date of Patent: May 20, 2025

(54) CERAMIC ELECTRONIC COMPONENT INCLUDING INSULATING LAYER

(71) Applicant: SAMSUNG ELECTRO-MECHANICS CO., LTD., Suwon-si (KR)

(72) Inventors: Jeong Mo Kang, Suwon-si (KR); Jin Mo Ahn, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 17/707,396

(22) Filed: Mar. 29, 2022

(65) Prior Publication Data

US 2023/0170145 A1    Jun. 1, 2023

(30) Foreign Application Priority Data

Nov. 29, 2021    (KR) ........................ 10-2021-0167100

(51) Int. Cl.
*H01G 4/224*    (2006.01)
*H01G 4/008*    (2006.01)
*H01G 4/30*    (2006.01)

(52) U.S. Cl.
CPC ............. *H01G 4/224* (2013.01); *H01G 4/008* (2013.01); *H01G 4/30* (2013.01)

(58) Field of Classification Search
CPC .......... H01G 4/008; H01G 4/30; H01G 2/065; H01G 4/012; H01G 4/12; H01G 4/1227; H01G 4/232; H01G 4/2325
See application file for complete search history.

(56) References Cited

U.S. PATENT DOCUMENTS

| 6,278,065 B1 * | 8/2001 | Hopper | H01C 1/028 |
| | | | 257/703 |
| 10,395,839 B1 * | 8/2019 | Park | H01G 4/232 |

(Continued)

FOREIGN PATENT DOCUMENTS

| JP | H08-162357 A | 6/1996 |
| JP | 2015-065283 A | 4/2015 |

(Continued)

OTHER PUBLICATIONS

Office Action issued on May 1, 2024, in the corresponding Korean Patent Application No. 10-2021-0167100.

*Primary Examiner* — Nathan Milakovich
*Assistant Examiner* — Daniel M Dubuisson
(74) *Attorney, Agent, or Firm* — Morgan, Lewis & Bockius LLP (57) ABSTRACT

A ceramic electronic component, includes: a body including a dielectric layer and first and second internal electrodes, the body having first and second surfaces, third and fourth surfaces, and fifth and sixth surfaces; a first external electrode disposed on the first surface of the body, and extending onto a portion of each of the third to sixth surfaces of the body; a second external electrode disposed on the second surface of the body and extending onto a portion of each of the third to sixth surfaces of the body; and an insulating layer disposed on the third to sixth surfaces of the body, and extending onto the first and second external electrodes, wherein in at least one of cross-sections in first and second directions and cross-sections in first and third directions, the insulating layer extends outwardly beyond the first and second surfaces of the body.

18 Claims, 6 Drawing Sheets

(56) References Cited

U.S. PATENT DOCUMENTS

| | | | |
|---|---|---|---|
| 10,395,840 B1* | 8/2019 | Park | H01G 2/065 |
| 2004/0240146 A1* | 12/2004 | Kayatani | H01G 2/103 |
| | | | 361/306.3 |
| 2014/0196936 A1* | 7/2014 | Hong | H01G 4/2325 |
| | | | 174/257 |
| 2014/0318841 A1* | 10/2014 | Kim | H01G 4/30 |
| | | | 361/301.4 |
| 2015/0084487 A1 | 3/2015 | Mori et al. | |
| 2015/0213953 A1* | 7/2015 | Jun | H01G 4/30 |
| | | | 252/512 |
| 2015/0287532 A1* | 10/2015 | Abe | H05K 3/3436 |
| | | | 427/79 |
| 2017/0164479 A1* | 6/2017 | Park | H01G 2/065 |
| 2017/0256359 A1* | 9/2017 | Masunari | H01G 4/005 |
| 2017/0271081 A1* | 9/2017 | Maki | H01G 4/248 |
| 2017/0323725 A1* | 11/2017 | Iso | H01F 27/292 |
| 2020/0066444 A1* | 2/2020 | Yang | H01G 4/12 |
| 2020/0075246 A1 | 3/2020 | Kim et al. | |
| 2020/0234885 A1* | 7/2020 | Yatagawa | H01G 4/1209 |
| 2020/0312571 A1* | 10/2020 | Yatagawa | H01G 4/232 |
| 2020/0365326 A1 | 11/2020 | Masunari | |
| 2021/0057155 A1* | 2/2021 | Zenzai | H01G 4/008 |
| 2021/0057161 A1* | 2/2021 | Zenzai | H01G 4/232 |

FOREIGN PATENT DOCUMENTS

| | | | |
|---|---|---|---|
| JP | 2016-063079 A | | 4/2016 |
| JP | 2016219481 A | * | 12/2016 |
| JP | 2017-130572 A | | 7/2017 |
| JP | 2017-147410 A | | 8/2017 |
| JP | 2020-188144 A | | 11/2020 |
| KR | 10-2019-0121164 A | | 10/2019 |

* cited by examiner

CERAMIC ELECTRONIC COMPONENT INCLUDING INSULATING LAYER

CROSS-REFERENCE TO RELATED APPLICATION

This application claims benefit of priority to Korean Patent Application No. 10-2021-0167100 filed on Nov. 29, 2021 in the Korean Intellectual Property Office, the disclosure of which is incorporated herein by reference in its entirety.

TECHNICAL FIELD

The present disclosure relates to a ceramic electronic component, that is, a multilayer ceramic capacitor (MLCC).

BACKGROUND

A multilayer ceramic capacitor may be used after being mounted on a printed circuit board (PCB), and in this case, due to a difference in coefficients of thermal expansion between the multilayer ceramic capacitor and the printed circuit board, repeated deformation may occur in a contact surface between the multilayer ceramic capacitor and the printed circuit board according to changes in operating temperature, which may cause cracks in the ceramic body.

SUMMARY

An aspect of the present disclosure is to provide a ceramic electronic component capable of preventing the above-described cracks that may occur when a substrate is mounted regardless of a mounting direction.

Another aspect of the present disclosure is to provide a ceramic electronic component having improved surface insulation properties and moisture resistance reliability.

One of the various solutions proposed through the present disclosure is to form an insulating layer disposed on an upper surface, a lower surface, a front surface, and a rear surface of the body and extending onto an external electrode.

According to an aspect of the present disclosure, a ceramic electronic component, includes: a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode disposed on the first surface of the body, and extending onto a portion of each of the third to sixth surfaces of the body; a second external electrode disposed on the second surface of the body and extending onto a portion of each of the third to sixth surfaces of the body; and an insulating layer disposed on the third to sixth surfaces of the body, and extending onto the first and second external electrodes, wherein in at least one of cross-sections in first and second directions and cross-sections in first and third directions, the insulating layer extends outwardly beyond the first and second surfaces of the body.

Another of the various solutions proposed through the present disclosure is to form an insulating layer covering an upper surface, a lower surface, a front surface, a rear surface of the body and a portion of external electrodes.

According to an aspect of the present disclosure, a ceramic electronic component includes: a body including a dielectric layer and a plurality of first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the first surface of the body, a first band portion extending from the first connection portion onto a portion of each of the third to sixth surfaces of the body, and a first corner portion connecting the first connection portion and the first band portion; a second external electrode including a second connection portion disposed on the second surface of the body, a second band portion extending from the second connection portion onto a portion of each of the third to sixth surfaces of the body, and a second corner portion connecting the second connection portion and the second band portion; and an insulating layer covering the third to sixth surfaces of the body and a portion of each of the first and second external electrodes, wherein in at least one of cross-sections in first and second directions and cross-sections in first and third directions, an end portion of the insulating layer is disposed on the first and second corner portions.

According to an aspect of the disclosure, a ceramic electronic component includes: a body including a dielectric layer and a plurality of first and second internal electrodes alternately disposed with the dielectric layer interposed therebetween, a first external electrode covering a first portion of the body, the first external electrode having a first outermost layer that has a first corner; a second external electrode covering a second portion of the body, the second external electrode having a second outermost layer that has a second corner; and an insulating layer disposed on an entirety of a portion of the body not covered by the first and second external electrodes, and the insulating layer is disposed on and extends beyond the first and second corners.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawings, a first direction may be defined as a length (L) direction, a second direction may be defined as a thickness (T) direction, and a third direction may be defined as a width (W) direction.

Figure 1:
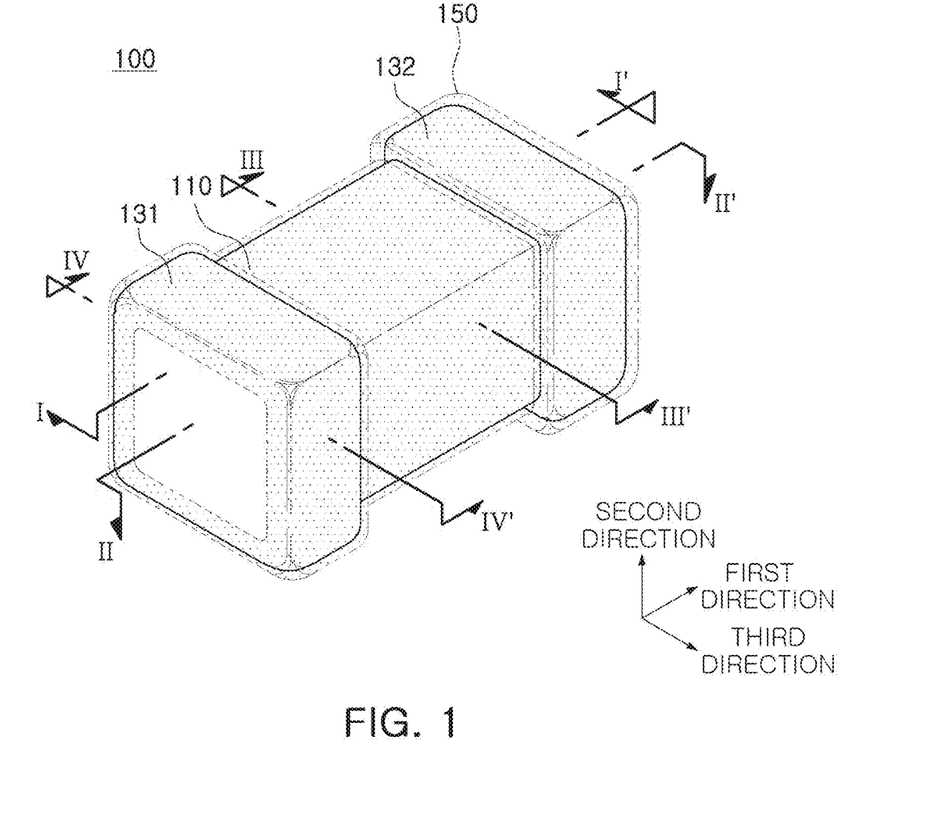
FIG. 1 is a schematic perspective view of a ceramic electronic component according to an example.

FIG. 1 is a schematic perspective view of a ceramic electronic component according to an example.

Figure 2:
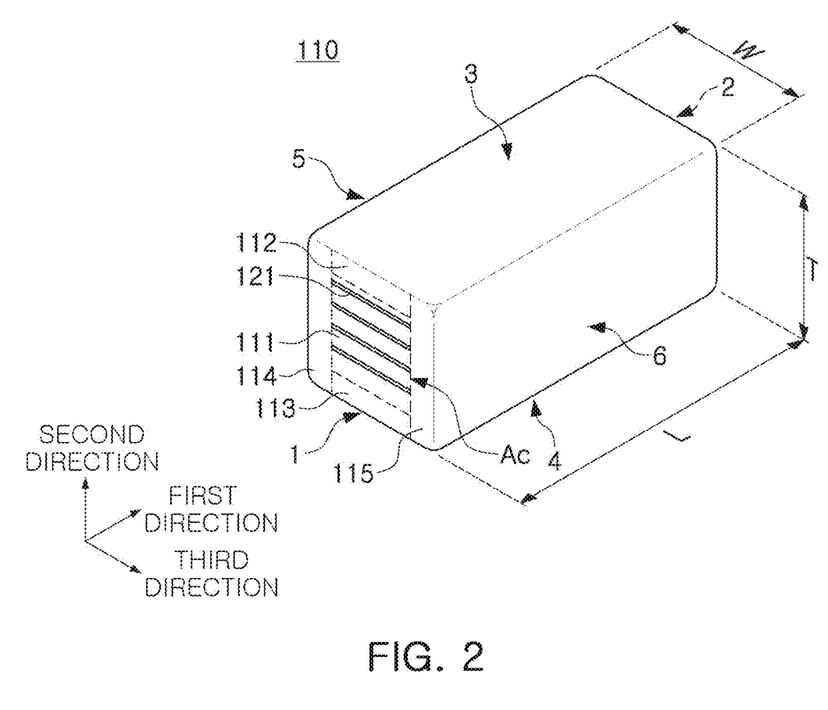
FIG. 2 is a schematic perspective view of a body of the ceramic electronic component of FIG. 1.

FIG. 2 is a schematic perspective view of a body of the ceramic electronic component of FIG. 1.

Figure 3:
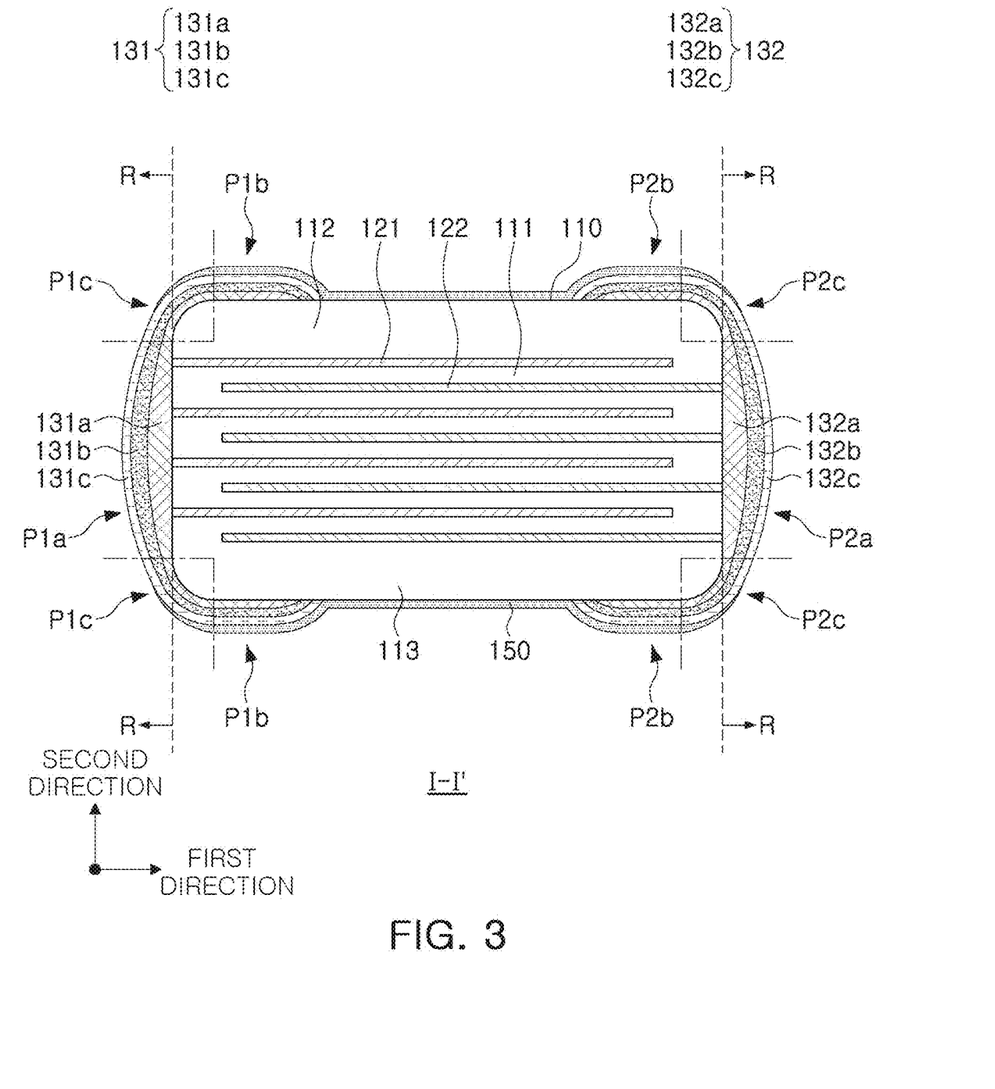
FIG. 3 is a cross-sectional view schematically illustrating cross-section I-I' of FIG. 1.

FIG. 3 is a cross-sectional view schematically illustrating cross-section I-I' of FIG. 1.

Figure 4:
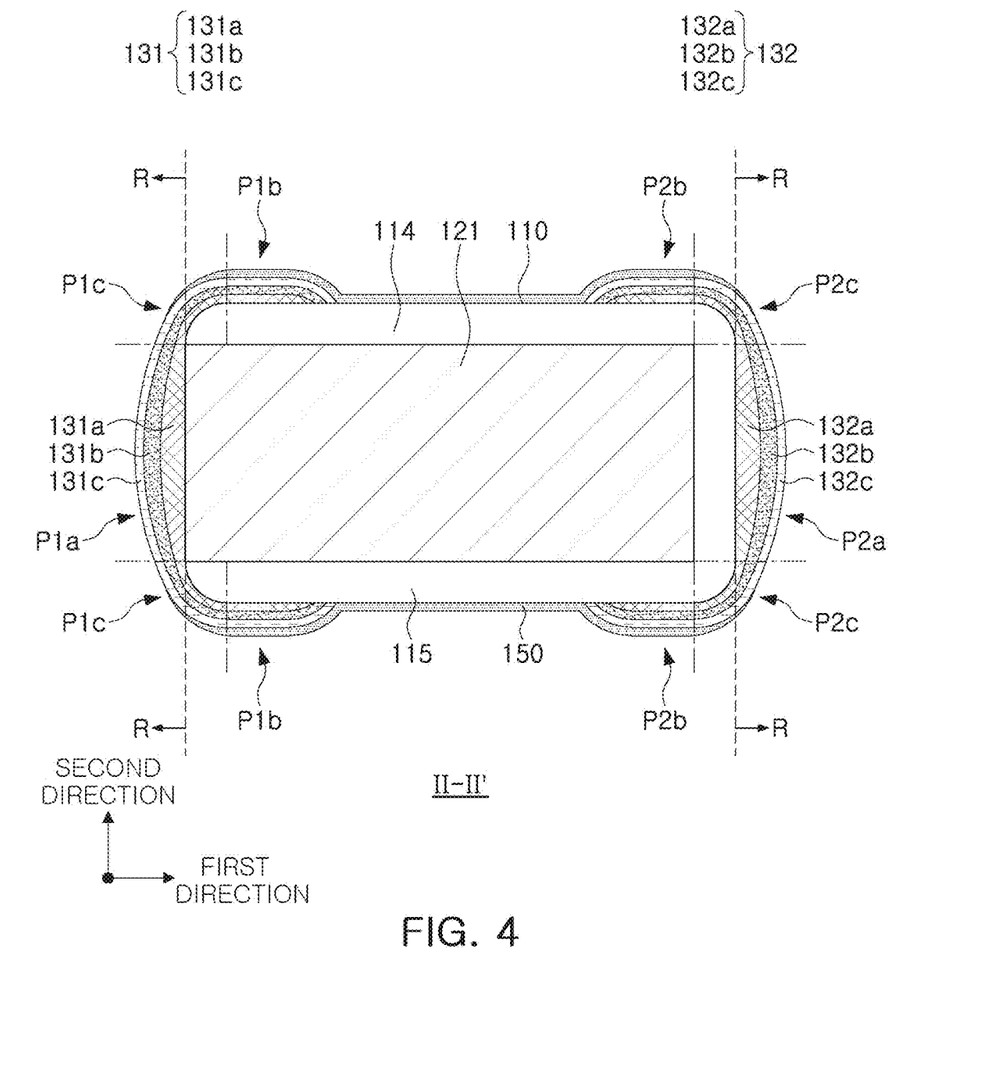
FIG. 4 is a cross-sectional view schematically illustrating cross-section II-II' of FIG. 1.

FIG. 4 is a cross-sectional view schematically illustrating cross-section II-II' of FIG. 1.

Figure 5:
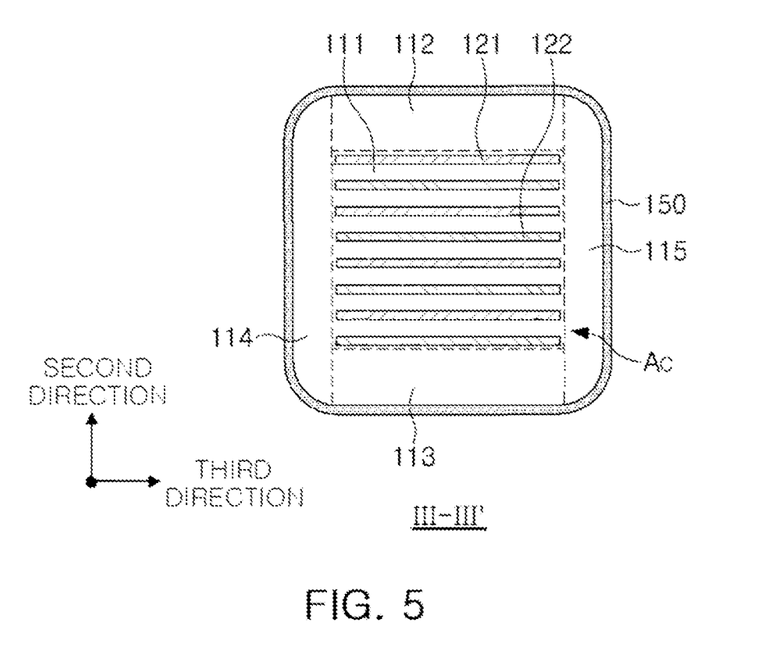
FIG. 5 is a cross-sectional view schematically illustrating cross-section III-III' of FIG. 1.

FIG. 5 is a cross-sectional view schematically illustrating cross-section III-III' of FIG. 1.

Figure 6:
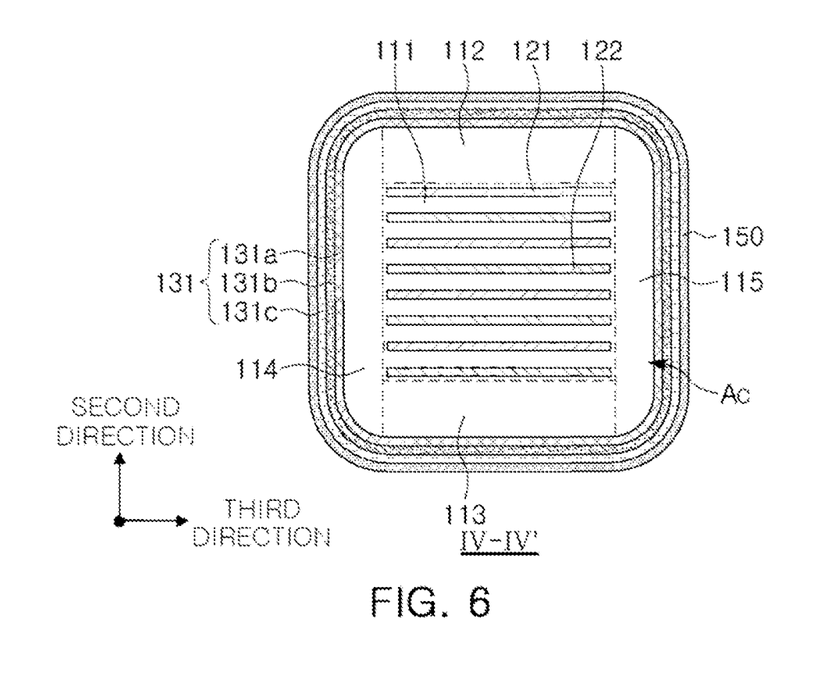
FIG. 6 is a cross-sectional view schematically illustrating cross-section IV-IV' of FIG. 1.

FIG. 6 is a cross-sectional view schematically illustrating cross-section IV-IV' of FIG. 1.

Referring to the drawings, a ceramic electronic component 100 according to an example includes a body 110 including a dielectric layer 111 and internal electrodes 121 and 122, external electrodes 131 and 132 disposed on the body 110 and connected to the internal electrodes 121 and 122, and an insulating layer 150 disposed on the body 110 and extending to the external electrodes 131 and 132.

As described above, the multilayer ceramic capacitor may be mounted on a printed circuit board and used, and in this case, due to a difference in coefficients of thermal expansion between the multilayer ceramic capacitor and the printed circuit board, repeated deformation may occur in a contact surface between the multilayer ceramic capacitor and the printed circuit board according to changes in operating temperature, thereby causing cracks in the ceramic body.

In order to improve this, it may be considered to prevent the occurrence of cracks in the ceramic body by forming an insulating layer on a mounting surface of the multilayer ceramic capacitor to prevent stress propagation into the chip. However, in this case, since the insulating layer is required to be mounted only in a direction in which the insulating layer is formed, there may be a problem of chips being packaged and mounted in a specific direction.

On the other hand, in a ceramic electronic component 100 according to an example, an insulating layer 150 may be formed on all of an upper surface, a lower surface, a front surface, and a rear surface of the body 110, and accordingly, the ceramic electronic component 100 according to example may prevent cracks in the body 110 that may occur when a substrate is mounted regardless of a mounting direction. In addition, in the ceramic electronic component 100 according to an example, since the insulating layer 150 may extend to cover the external electrodes 131 and 132, surface insulation and moisture resistance reliability may be effectively improved.

Hereinafter, each configuration included in the ceramic electronic component 100 according to an example will be described in more detail.

A shape of the body 110 is not particularly limited, and may be a hexahedral shape or a shape similar to the hexahedral shape. Although the body 110 does not have a hexahedral shape having perfectly straight lines due to shrinkage of ceramic powder particles included in the body 110 in a sintering process, the body 110 may have a substantially hexahedral shape. An angular shape of the body 110, for example, a corner portion may be polished in a round manner by a polishing process, or the like.

The body 110 may have first and second surfaces 1 and 2 opposing each other in a length direction, third and fourth surfaces 3 and 4 connected to the first and second surfaces 1 and 2 and opposing each other in a thickness direction, and fifth and sixth surfaces 5 and 6 connected to the first and second surfaces 1 and 2, connected to the third and fourth surfaces 3 and 4, and opposing each other in a width direction.

In the body 110, a dielectric layer 111 and internal electrodes 121 and 122 may be alternately stacked. The plurality of dielectric layers 111 forming the body 110 may be in a sintered state, and a boundary between the adjacent dielectric layers 111 may be integrated to such an extent that it is difficult to determine without using a scanning electron microscope (SEM).

The dielectric layer 111 may be formed by sintering a ceramic green sheet including ceramic powder, an organic solvent, and an organic binder. The ceramic powder is a material having a high dielectric constant, and a barium titanate ($BaTiO_3$)-based material, a strontium titanate ($SrTiO_3$)-based material, or the like may be used, but an embodiment thereof is not limited thereto.

A thickness of the dielectric layer 111 does not need to be particularly limited, but in general, when the dielectric layer 111 is thinly formed to have a thickness of less than 0.6 µm, in particular, when the thickness of the dielectric layer 111 is 0.4 µm or less, reliability may be deteriorated. On the other hand, in the present disclosure, even when the thickness of the dielectric layer 111 is 0.4 µm or less, excellent reliability may be secured. Accordingly, when the thickness of the dielectric layer 111 is 0.4 µm or less, an effect of improving reliability according to the present disclosure may be more remarkable, and miniaturization and high capacitance of the ceramic electronic component may be more easily achieved.

The thickness of the dielectric layer 111 may refer to an average thickness of the dielectric layer 111 disposed between the internal electrodes 121 and 122. The average thickness of the dielectric layer 111 may be measured from an image obtained by scanning a cross-section of the body 110 in the length and thickness direction (L-T) with a scanning electron microscope (SEM) at a magnification of 10,000. More specifically, thicknesses of one dielectric layer may be measured at 30 points arranges at equal intervals in a length direction to obtain an average value of the measured thicknesses. The thicknesses of the dielectric layer measured at the 30 points arranged at the equal intervals may be designated in the active portion Ac, to be described later. In addition, if the average value is measured by extending the measurement of the average value to 10 dielectric layers 111, the average thickness of the dielectric layer 111 may be further generalized.

The body 110 may include an active portion Ac including a plurality of first internal electrodes 121 and a plurality of second internal electrodes 122 disposed to face each other with the dielectric layer 111 interposed therebetween and having capacitance formed therein. The active portion Ac, contributing to forming capacitance of a capacitor, and may be formed by repeatedly stacking the plurality of first and second internal electrodes 121 and 122 with the dielectric layer 111 interposed therebetween.

The body 110 may further include cover portions 112 and 113 disposed above and below the active portion Ac based on a thickness direction. The cover portions 112 and 113 may include a first cover portion 112 disposed above the active portion Ac and a second cover portion 113 disposed below the active portion Ac. The first cover portion 112 and the second cover portion 113 may be formed by stacking a single dielectric layer or two or more dielectric layers on upper and lower surfaces of the active portion Ac in a thickness direction, respectively, and may basically serve to prevent damage to the internal electrodes due to physical or chemical stress. The cover portions 112 and 113 may not include internal electrodes, and may include the same material as the dielectric layer 111. For example, the cover portions 112 and 113 may include a ceramic material, for example, may include the above-described barium titanate-based material. A thickness of the cover portions 112 and 113 does not need to be particularly limited. However, in order to more easily achieve miniaturization and high capacitance of the ceramic electronic component, the thickness of the cover portions 112 and 113 may be 20 μm or less.

The body 110 may further include margin portions 114 and 115 disposed on both side portions of the active portion Ac based on a width direction. The margin portions 114 and 115 may include a first margin portion 114 providing the fifth surface 5 of the body 110 and a second margin portion 115 providing the sixth surface 6 of the body 110. The margin portions 114 and 115 may refer to regions between both ends of the first and second internal electrodes 121 and 122 and a boundary surface of the body 110 in a cross-section of the body 110 cut in the width-thickness (W-T) direction. The margin portions 114 and 115 may basically serve to prevent damage to the internal electrodes 121 and 122 due to physical or chemical stress. The margin portions 114 and 115 may include the same or different material from that of the dielectric layer 111. For example, the margin portions 114 and 115 may be formed by applying a conductive paste onto the ceramic green sheet except for a place where margin portions are to be formed to form the internal electrodes. Alternately, in order to suppress a step difference by the internal electrodes 121 and 122, after it is cut so that the internal electrodes 121 and 122 are exposed after lamination, the margin portions 114 and 115 may also be formed by stacking a single dielectric layer or two or more dielectric layers on both side portions of the active portion Ac in a width direction.

The internal electrodes 121 and 122 may be alternately stacked with the dielectric layer 111. The internal electrodes 121 and 122 may include a plurality of first internal electrodes 121 and a plurality of second internal electrodes 122. The plurality of first internal electrodes 121 and the plurality of second internal electrodes 122 may be alternately disposed to face each other with the dielectric layer 111 interposed therebetween, and may be exposed to the first and second surfaces 1 and 2 of the body 110, respectively. For example, each of the plurality of first internal electrodes 121 may be spaced apart from the second surface 2 and exposed through the first surface 1. Also, each of the plurality of second internal electrodes 122 may be spaced apart from the first surface 1 and exposed through the second surface 2. The plurality of first internal electrodes 121 and the plurality of second internal electrodes 122 may be electrically separated from each other by the dielectric layer 111 disposed therebetween. The plurality of first internal electrodes 121 and the plurality of second internal electrodes 122 may be alternately stacked in the thickness direction, but an embodiment thereof is not limited thereto, and may be alternately stacked in the width direction.

The internal electrodes 121 and 122 may be formed of a conductive paste including a conductive metal. For example, the internal electrodes 121 and 122 may be printed by printing a conductive paste on the ceramic green sheet forming the dielectric layer 111 through a printing method such as a screen printing method, a gravure printing method, or the like. When the ceramic green sheet on which the internal electrodes 121 and 122 are printed is alternately and/or sintered, an active portion Ac of the body 110 may be formed. The conductive metal is not limited thereto, but may include nickel (Ni), copper (Cu) palladium (Pd), silver (Ag), gold (Au), platinum (Pt), tin (Sn), tungsten (W), titanium (Ti), and/or alloys thereof.

A thickness of the internal electrodes 121 and 122 does not need to be particularly limited, but in general, when the internal electrodes 121 and 122 are formed to have a thickness of less than 0.6 μm, in particular, the thickness of the internal electrodes 121 and 122 is 0.4 μm, reliability may be decreased. On the other hand, even when the thickness of the internal electrodes 121 and 122 is 0.4 μm or less in the present disclosure, excellent reliability can be secured. Therefore, when the thickness of the internal electrodes 121 and 122 is 0.4 μm or less, an effect of improving the reliability according to the present disclosure may be more remarkable, and miniaturization and high capacitance of the ceramic electronic component may be more easily achieved.

The thickness of the internal electrodes 121 and 122 may refer to an average thickness of the internal electrodes 121 and 122. The average thickness of the internal electrodes 121 and 122 may be measured from an image obtained by scanning a cross-section of the body 110 in the length and thickness direction (L-T) with a scanning electron microscope (SEM) at a magnification of 10,000. More specifically, thicknesses of one dielectric layer may be measured at 30 points arranged at equal intervals in a length direction to obtain an average value of the measured thicknesses. The thicknesses of the dielectric layer measured at the 30 points arranged at the equal intervals may be designated in the active portion Ac. In addition, if the average value is measured by extending the measurement of the average value to 10 internal electrodes, the average thickness of the internal electrodes may be further generalized.

The external electrodes 131 and 132 may be disposed on the first surface 1 and the second surface 2 of the body 110, such that each of the external electrodes 131 and 132 may extend to the third surface 3, the fourth surface 4, the fifth surface 5, and the sixth surface 6. The external electrodes 131 and 132 may include a first external electrode 131 and a second external electrode 132 respectively connected to the plurality of first internal electrodes 121 and the plurality of second internal electrodes 122.

The first external electrode 131 may be disposed on the first surface 1 of the body 110, such that a portion thereof may extend to the third surface 3, the fourth surface 4, the fifth surface 5, and the sixth surface 6 of the body 110, respectively. In this regard, the first external electrode 131 may include a first connection portion P1a disposed on the first surface 1 of the body 110, a first band portion P1b extending from the first connection portion P1a onto a portion of each of the third surface 3, the fourth surface 4, the fifth surface 5, and the sixth surface 6, and a first corner portion P1c connecting the first connection portion P1a and the first band portion P1b. The first corner portion P1c may be disposed on a corner in which the first surface 1 of the body 110 is respectively connected to the third surface 3, the fourth surface 4, the fifth surface 5, and the sixth surface 6. The first corner portion P1c may have a round shape.

The second external electrode 132 may be disposed on the second surface 2 of the body 110, such that a portion thereof may extend to the third surface 3, the fourth surface 4, the fifth surface 5, and the sixth surface 6 of the body 110, respectively. In this regard, the second external electrode 132 may include a second connection portion P2a disposed on the second surface 2 of the body 110, a second band portion P2b extending from the second connection portion P2a onto a portion of each of the third surface 3, the fourth surface 4, the fifth surface 5, and the sixth surface 6, and a second corner portion P2c connecting the second connection portion P2a and the second band portion P2b. The second corner portion P2c may be disposed on a corner in which the second surface 2 of the body 110 is respectively connected to the third surface 3, the fourth surface 4, the fifth surface 5, and the sixth surface 6. The second corner portion P2c may have a round shape.

In the drawings, a structure in which the ceramic electronic component 100 has two external electrodes 131 and 132 is described, but the present disclosure is not limited thereto, and the number or shape of the external electrodes 131 and 132 may be changed according to the shape of the internal electrodes 131 and 122 or other purposes.

The external electrodes 131 and 132 may be formed of any material as long as they have electrical conductivity, such as metal, or the like, and a specific material may be determined in consideration of electrical characteristics, structural stability, and the like, and may further have a multilayer structure. For example, the external electrodes 131 and 132 may include first electrode layers 131a and 131b disposed on the body 110, second electrode layers 131b and 132b disposed on the first electrode layers 131a and 132a, and third electrode layers 131c and 132c disposed on the second electrode layers 131b and 132b.

The first electrode layers 131a and 132a may be sintered electrodes, including, for example, a conductive metal and glass. The first electrode layers 131a and 132a may be formed by dipping a body 110 into a paste including a conductive metal and glass. Alternatively, the first electrode layers 131a and 132a may be formed by transferring a sheet including a conductive metal and glass onto the body 110. As the conductive metal included in the first electrode layers 131a and 132a, a material having excellent electrical conductivity may be used, but an embodiment thereof is not limited thereto. For example, the conductive metal may include copper (Cu), nickel (Ni), palladium (Pd), platinum (Pt), gold (Au), silver (Ag), lead (Pb) and/or alloys thereof, preferably, and may include copper and/or nickel (Ni), but an embodiment thereof is not limited thereto.

The second electrode layers 131b and 132b may be, for example, resin-based electrodes including a conductive metal and a resin. The second electrode layers 131b and 132b may be formed by applying and curing a paste including a conductive metal and a resin. As the conductive metal included in the second electrode layers 131b and 132b, a material having excellent electrical conductivity may be used, but an embodiment thereof is not particularly limited. For example, the conductive metal may include copper (Cu), nickel (Ni), palladium (Pd), platinum (Pt), gold (Au), silver (Ag), lead (Pb) and/or alloys thereof, preferably, and may include copper and/or nickel (Ni), but an embodiment thereof is not limited thereto. As the resin included in the second electrode layers 131b and 132b, an insulating resin may be used, and is not particularly limited. For example, the resin may include an epoxy resin, but an embodiment thereof is not limited thereto.

The third electrode layers 131c and 132c may improve mounting characteristics. A type of the third electrode layers 131c and 132c is not particularly limited, and may be plating layers including nickel (Ni), tin (Sn), palladium (Pd), and/or alloys thereof, and may be formed of a plurality of layers. The third electrode layers 131c and 132c may be, for example, a nickel (Ni) plating layer or a tin (Sn) plating layer, and may have a form in which a nickel (Ni) plating layer or a tin (Sn) plating layer are sequentially formed. In addition, the third electrode layers 131c and 132c may include a plurality of nickel (Ni) plating layers and/or a plurality of tin (Sn) plating layers.

The insulating layer 150 may prevent a crack from occurring by preventing a stress into the body 110 when the substrate is mounted. In addition, the insulating layer 150 may prevent moisture and/or moisture from penetrating, thereby improving moisture resistance reliability. In addition, the insulating layer 150 may improve surface insulation properties, such as preventing surface insulation breakdown, when a high voltage is applied. The insulating layer 150 may be disposed on the third surface 3, the fourth surface 4, the fifth surface 5, and the sixth surface 6 of the body 110 to extend onto the external electrodes 131 and 132. The insulating layer 150 may cover the third surface 3, the fourth surface 4, the fifth surface 5, and the sixth surface 6, and a portion of the external electrodes 131 and 132.

The insulating layer 150 may include a material having electrical insulating properties, and a material thereof is not particularly limited. For example, the insulating layer 150 may include at least one of a resin and a ceramic. For example, the insulating layer 150 may include a resin, a ceramic, or a mixture thereof. The resin may include, for example, an epoxy resin, a silicone resin, a fluorine resin, a phenolic resin, a urea resin, a melamine resin, and/or an unsaturated polyester resin, but an embodiment thereof is not limited thereto. The ceramic may include lead zirconate titanate, alumina, silica, silicon carbide, and/or magnesium oxide, but an embodiment thereof is not limited thereto.

The insulating layer 150 may extend to a region outwardly beyond an outer surface of the body 110 to sufficiently cover the external electrodes 131 and 132. For example, in a cross-section in length and thickness directions (e.g., FIG. 3), and/or a cross-section in length and width directions (e.g., FIG. 4), the insulating layer 150 may extend outwardly (R) beyond the first surface 1 and the second surface 2. For example, in the cross-sections in length and thickness directions (e.g., FIG. 3) and/or the cross-sections in length and width directions (e.g., FIG. 4), an end portion of the insulating layer 150 may be disposed in first and second corner portions P1c and P2c. As described above, when the insulating layer 150 extends to a region outwardly beyond the outer surface of the body 110 to sufficiently cover the external electrodes 131 and 132, an effect of improving stress may be very excellent, and surface insulation properties and moisture resistance reliability may be more effectively improved.

The insulating layer 150 may cover an entirety of the third surface 3, the fourth surface 4, the fifth surface 5, and the sixth surface 6 of the body 110. For example, the body 110 may be entirely covered so that the body 110 is not exposed. The insulating layer 150 may further cover at least a portion disposed on a corner, connected to the first and second surfaces 1 and 2 of each of the third surface 3, the fourth surface 4, the fifth surface 5, and the sixth surface 6 of the body 110. For example, the insulating layer 150 may sufficiently cover not only the body 110 but also the external electrodes 131 and 132 as described above.

Figure 7:
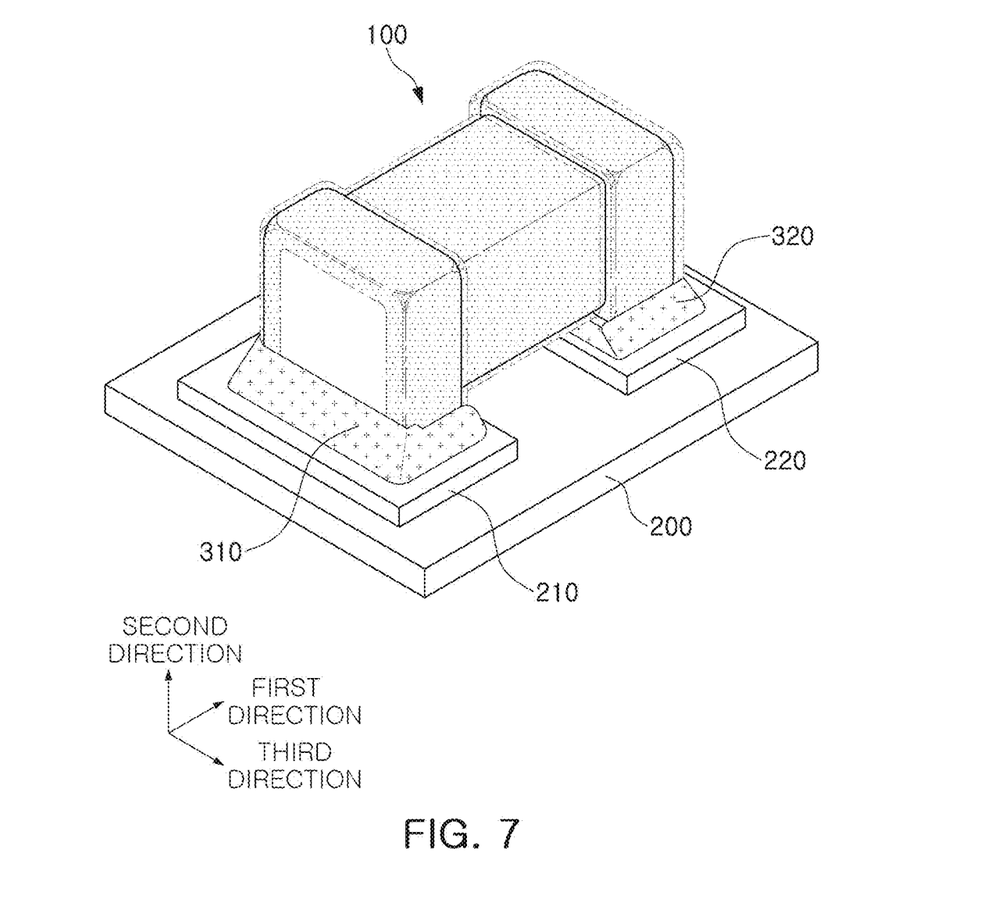
FIG. 7 is a schematic perspective view of a case in which the ceramic electronic component of FIG. 1 is mounted on a substrate.

FIG. 7 is a schematic perspective view illustrating a case in which the ceramic electronic component of FIG. 1 is mounted on a substrate.

Referring to FIG. 7, the ceramic electronic component 100 according to an example may be mounted on electrode pads 210 and 220 of a printed circuit board 200 through conductive adhesives 310 and 320 such as a solder. As described above, the ceramic electronic component 100 according to an example may be mounted on the printed circuit board 200 regardless of a mounting direction. In addition, cracks that may occur in the body 110 may be prevented through the insulating layer 150. In addition, surface insulation properties and moisture resistance reliability may be improved through the insulating layer 150.

Other contents are substantially the same as those described in the ceramic electronic component 100 according to the above-described example, and overlapping contents thereof will be omitted.

Although a multilayer ceramic capacitor has been described as an example of a ceramic electronic component in the present disclosure, an embodiment of the present disclosure is not limited thereto, and the present disclosure may be applied to other types of ceramic electronic components, for example, an inductor, a piezoelectric element, a varistor, a thermistor, and the like.

As set forth above, as one effect among various effects of the present disclosure, a ceramic electronic component capable of preventing cracks that may occur when a substrate is mounted regardless of a mounting direction may be provided.

As another effect among various effects of the present disclosure, a ceramic electronic component capable of improving surface insulation properties and moisture resistance reliability may be provided.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items. It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. An electronic component, comprising:
   a ceramic electronic component comprising:
      a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;
      a first external electrode including a first band portion disposed on a first portion of each of the third to sixth surfaces of the body;
      a second external electrode including a second band portion disposed on a second portion of each of the third to sixth surfaces of the body, wherein each of the first and second external electrodes comprises a first electrode layer disposed on the body and including a first conductive metal and glass, and a second electrode layer disposed on the first electrode layer and including a second conductive metal and a first resin; and
      an insulating layer disposed on the third to sixth surfaces of the body and an entirety of a portion of the body that is not covered by the first and second external electrodes, and extending onto the first and second external electrodes, the insulating layer covers an entirety of the first and second band portions, and the insulating layer comprising a second resin comprising at least one selected from a silicone resin, a fluorine resin, a urea resin, a melamine resin, and an unsaturated polyester resin,
   a printed circuit board comprising an electrode pad; and a conductive adhesive, wherein the ceramic electronic component is mounted on the electrode pad through the conductive adhesive, and the conductive adhesive is disposed on either the third surface or the fourth surface, wherein the plurality of first and second internal electrodes are alternately disposed in the second direction, and wherein, in at least one of cross-sections in the first and second directions and cross-sections in the first and third directions, the insulating layer extends outwardly beyond the first and second surfaces of the body.

2. The electronic component of claim 1, wherein the insulating layer further covers at least a portion disposed on a corner connecting each of the third to sixth surfaces of the body to each of the first and second surfaces of the body.

3. The electronic component of claim 1, wherein the insulating layer further comprises a ceramic.

4. The electronic component of claim 3, wherein the ceramic comprises at least one of lead zirconate titanate, alumina, silica, silicon carbide, and magnesium oxide.

5. The electronic component of claim 1, wherein the second resin of the insulating layer comprises the silicone resin.

6. The electronic component of claim 1, wherein the first conductive metal of the first electrode layer comprises copper (Cu) or nickel (Ni), the second conductive metal of the second electrode layer comprises copper (Cu) or nickel (Ni), and the first resin of the second electrode layer comprises an epoxy resin.

7. The electronic component of claim 1, wherein the first and second external electrodes further comprise a third electrode layer disposed on the second electrode layer and including a third conductive metal, respectively.

8. The electronic component of claim 7, wherein the third electrode layer has a multilayer structure including a first layer including nickel (Ni) as the third conductive metal and a second layer including tin (Sn) as a fourth conductive metal.

9. An electronic component, comprising:
a ceramic electronic component comprising:
a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the first surface of the body, a first band portion extending from the first connection portion onto a first portion of each of the third to sixth surfaces of the body, and a first corner portion connecting the first connection portion and the first band portion;
a second external electrode including a second connection portion disposed on the second surface of the body, a second band portion extending from the second connection portion onto a second portion of each of the third to sixth surfaces of the body, and a second corner portion connecting the second connection portion and the second band portion, wherein each of the first and second external electrodes comprises a first electrode layer disposed on the body and including a first conductive metal and glass, and a second electrode layer disposed on the first electrode layer and including a second conductive metal and a first resin; and
an insulating layer covering the third to sixth surfaces of the body and a portion of each of the first and second external electrodes, the insulating layer comprising a second resin comprising at least one selected from a silicone resin, a fluorine resin, a urea resin, a melamine resin, and an unsaturated polyester resin;
a printed circuit board comprising an electrode pad; and
a conductive adhesive,
wherein the ceramic electronic component is mounted on the electrode pad through the conductive adhesive, and the conductive adhesive is disposed on the first band portion and the second band portion,
wherein, in at least one of cross-sections in the first and second directions and cross-sections in the first and third directions, an end portion of the insulating layer is disposed on the first and second corner portions, and
wherein the insulating layer covers an entirety of the first and second band portions.

10. The electronic component of claim 9, wherein the first corner portion is disposed at a corner at which the first surface of the body is connected to the third to sixth surfaces of the body, respectively,
wherein the second corner portion is disposed at a corner at which the second surface of the body is connected to the third to sixth surfaces of the body, respectively.

11. The electronic component of claim 9, wherein the first and second corner portions have a rounded shape.

12. An electronic component, comprising:
a ceramic electronic component comprising:
a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode covering a first portion of the body, the first external electrode having a first band portion, a first corner portion, and a first outermost layer that has a first corner, wherein the first corner is disposed in the first corner portion, and the first band portion extends from the first corner portion onto a first portion of each of the third to sixth surfaces of the body;
a second external electrode covering a second portion of the body, the second external electrode having a second band portion, a second corner portion, and a second outermost layer that has a second corner, wherein the second corner is disposed in the second corner portion, wherein the second band portion extends from the second corner portion onto a second portion of each of the third to sixth surfaces of the body, wherein each of the first and second external electrodes comprises a first electrode layer disposed on the body and including a first conductive metal and glass, and a second electrode layer disposed on the first electrode layer and including a second conductive metal and a first resin; and an insulating layer disposed on an entirety of a portion of the body not covered by the first and second external electrodes, the insulating layer covers an entirety of the first and second band portions, the insulating layer is disposed on and extends beyond the first and second corners, and the insulating layer has an end portion disposed on the first and second corner portions;

a printed circuit board comprising an electrode pad; and a conductive adhesive, wherein the ceramic electronic component is mounted on the electrode pad through the conductive adhesive, and the conductive adhesive is disposed on either the third surface or the fourth surface, and wherein the plurality of first and second internal electrodes are alternately disposed in the second direction.

13. The electronic component of claim 12, wherein the first and second corners have a rounded shape.

14. The electronic component of claim 12, wherein each of the first and second outermost layers includes a third conductive metal.

15. The electronic component of claim 14, wherein the first and second conductive metals of the first and second outermost layers, respectively, includes one of nickel (Ni) and tin (Sn).

16. The electronic component of claim 12, wherein the first corner is disposed at a corner at which the first surface of the body is connected to each of the third to sixth surfaces of the body, and the second corner is disposed at a corner at which the second surface of the body is connected to each of the third to sixth surfaces of the body.

17. The electronic component of claim 12, wherein the insulating layer is disposed on and covers (i) edges connecting adjacent first corners, and (ii) edges connecting adjacent second corners.

18. The electronic component of claim 12, wherein the insulating layer comprises a second resin comprising at least one selected from a silicone resin, a fluorine resin, a urea resin, a melamine resin, and an unsaturated polyester resin.

* * * * *